(12) United States Patent
Loche et al.

(10) Patent No.: US 7,530,646 B2
(45) Date of Patent: May 12, 2009

(54) MASTER CYLINDER ASSEMBLY

(75) Inventors: Jacques Loche, Asnieres (FR); Philippe Georges Castel, Paris (FR)

(73) Assignee: Delphi Technologies, Inc., Troy, MI (US)

( * ) Notice: Subject to any disclaimer, the term of this patent is extended or adjusted under 35 U.S.C. 154(b) by 304 days.

(21) Appl. No.: 11/348,752

(22) Filed: Feb. 7, 2006

(65) Prior Publication Data

US 2006/0175898 A1 Aug. 10, 2006

(30) Foreign Application Priority Data

Feb. 7, 2005 (EP) .................................. 05290260

(51) Int. Cl.
*B60T 8/44* (2006.01)
*B60T 11/28* (2006.01)

(52) U.S. Cl. ...................... 303/114.3; 188/357; 60/562; 60/589

(58) Field of Classification Search ............. 303/114.1, 303/114.2, 114.3; 188/345, 355, 356, 357, 188/358, 359, 360; 60/562, 589, 591
See application file for complete search history.

(56) References Cited

U.S. PATENT DOCUMENTS 4,716,733 A * 1/1988 Sugihara et al. ............... 60/589
5,916,141 A * 6/1999 Kim ............................. 60/562
2004/0239176 A1* 12/2004 Beccafico et al. ......... 303/115.1

FOREIGN PATENT DOCUMENTS

| EP | 0601769 | 6/1994 |
| EP | 1018459 | 7/2000 |
| FR | 2134082 | 12/1972 |
| FR | 2858958 A1 * | 2/2005 |

OTHER PUBLICATIONS

Machine translation of EP 1018459.*

* cited by examiner

*Primary Examiner*—Thomas J Williams
(74) *Attorney, Agent, or Firm*—Thomas N. Twomey

(57) ABSTRACT

Master cylinder assembly (1) for hydraulic control includes a master cylinder body (2) having a longitudinal bore (3). A piston (6) is arranged in the said bore and includes a seal packing (15) separating two chambers (16, 29) adapted to contain a liquid. The piston also includes a recovery conduit (36) connecting the chambers and by-passes the seal packing, and a valve (38). When the piston is in a rest position, an actuator (54) adjusts the position of the valve between an open position opening the recovery conduit and a closed position closing the recovery conduit.

6 Claims, 3 Drawing Sheets

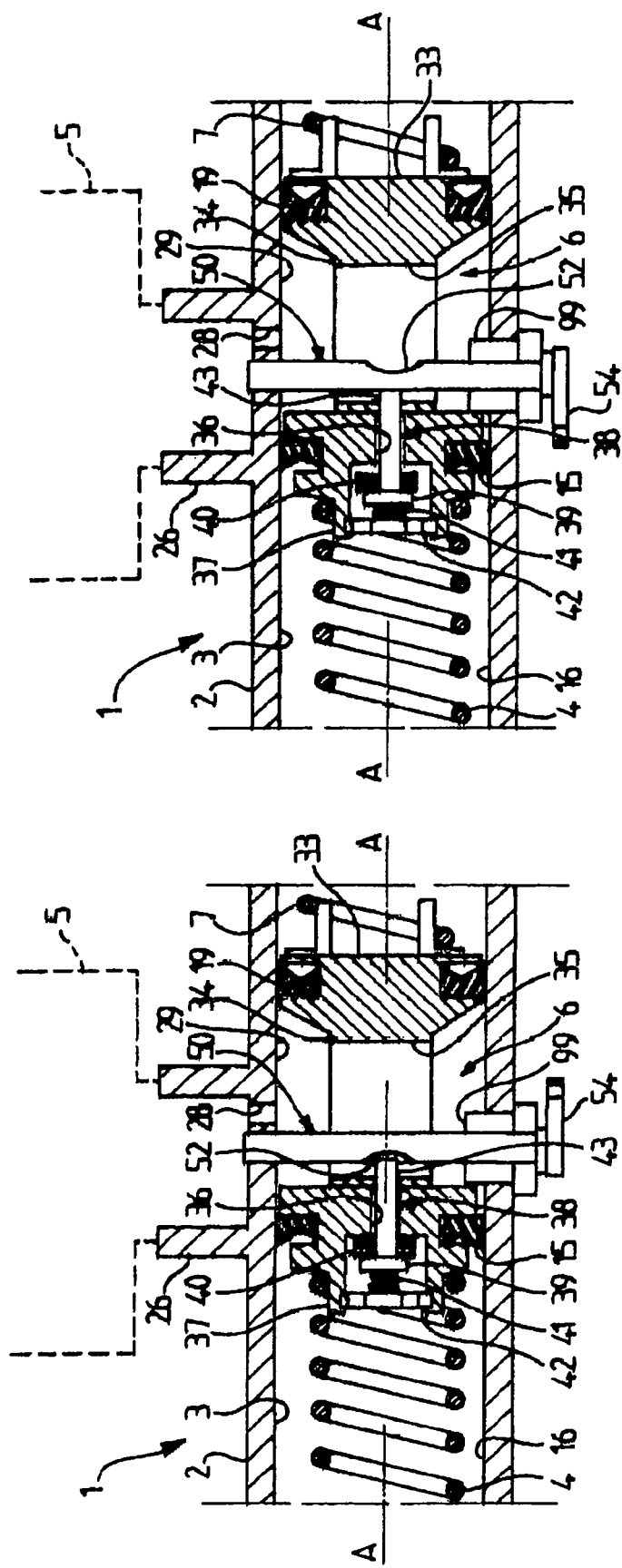
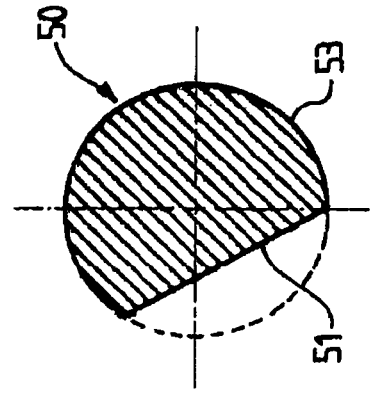
FIG. 1
FIG. 2
FIG. 3

MASTER CYLINDER ASSEMBLY

BACKGROUND OF THE INVENTION

The present invention relates to master cylinder assemblies for hydraulic control, in particular for control of the braking of a vehicle.

A master cylinder assembly for hydraulic control is known from FR 2134082 of the type comprising:

- a master cylinder body in which is formed a longitudinal bore emerging at the level of one end of the said master cylinder body,
- at least one piston arranged in the said bore and provided, on the one hand, with a seal packing which is in tight contact with a peripheral wall of the said bore and which separates a pressure chamber and a supply chamber intended to contain a liquid in the said bore and, on the other, a recovery conduit connecting the said chambers by-passing the said seal packing,
- a valve moveably carried by the said piston and elastically biased towards a position closing the said recovery conduit,
- a stop device retained longitudinally in the said bore and able to co-operate with the said valve in a predetermined rest position of the said piston to define a corresponding open rest position of the said valve.

In this master cylinder assembly, the stop device must open the recovery conduit in the rest position of the piston. The piston necessarily has, departing from the rest position, a certain dead travel in the course of which substantially no hydraulic control pressure is created in the pressure chamber, due to the fact that the recovery conduit is not closed and the liquid can therefore escape into the supply chamber through the recovery conduit. This dead travel corresponds to closing travel of the moveable valve carried by the piston.

The stop device of this master cylinder assembly is adjustable, which, on building of the master cylinder assembly, permits precise adjustment of this dead travel to meet two requirements. On the one hand, it is desirable to minimise this dead travel in order to improve the response time of the master cylinder assembly, which is particularly critical to the efficiency of a braking system (dead travel in the master cylinder resulting in a distance travelled by the vehicle unbraked) and, where necessary, in order to limit the travel of the brake pedal for the comfort of the user. On the other hand, it must ensure satisfactory opening of the recovery conduit when the piston returns to its rest position, in order to ensure that the pressure in the pressure chamber drops back to a reference pressure, typically atmospheric pressure, which is maintained in the supply chamber by means of a supply conduit. The opening of the recovery conduit is also necessary so that when the hydraulic circuit at the output of the master cylinder assembly has a leak, the level of liquid in the supply reservoir drops, which permits detection of the leak.

In this device, even with very fine adjustment it is therefore impossible to completely eliminate the dead travel of the piston from its rest position. This device therefore does not offer maximum safety or optimal user comfort as a result of an inescapable response delay due to this dead travel.

The aim of the invention is to propose a master cylinder assembly not having at least certain of the above-mentioned disadvantages of the prior art. More precisely, the aim of the invention is to propose a master cylinder assembly in which the response time is improved.

SUMMARY OF INVENTION

In accordance with this invention, a master cylinder assembly for hydraulic control comprises a master cylinder body in which is formed a longitudinal bore. A piston is arranged in the said bore and includes a seal packing in tight contact with the peripheral wall of the said bore. The piston separates the bore into two chambers adapted to contain a liquid. The piston also includes a recovery conduit connecting the chambers and by-passing the seal packing, and a valve having an open position and a closed position to control fluid flow through the recovery conduit. The assembly also includes an actuator adapted to adjust the position of the valve when the piston is in a rest position of the said piston, to open or close the value to allow or block fluid flow through the recovery conduit.

During operation, when the piston is in the rest position, the actuator may be adjusted to position the valve in the closed position. As a result, the piston does not have any dead travel, since any displacement of the piston will create pressure in the chamber. When the actuator positions the valve in the open position, the pressure in the pressure chamber is permitted to drop to a reference pressure, that is, when the master cylinder assembly does not apply a control pressure. Moreover, if there is a leak detector based on the level of liquid in the supply reservoir, leaks can still be detected in this open position.

Preferably, the valve is elastically biased to a closed position. In a preferred embodiment, the master cylinder assembly includes a stop device disposed in the bore and adapted to co-operate with the valve when the piston is in the rest position. The actuator engages the stop device outside the body of the master cylinder and is adapted to position the stop device in a first state corresponding to the open position and in a second state corresponding to the closed position.

Preferably, the stop device has a cam surface that engages the valve to displace the valve from the closed position to the open position on displacement of the stop device from the second state to the first state.

In accordance with a particular embodiment, the stop device comprises a rotatably moveable pin presenting the cam surface, so that the actuator is able to displace the pin in rotation.

Preferably, the pin is substantially circularly cylindrical and has a cut flat defining the cam surface, such that peripheral surface of the pin presents a circular portion able to co-operate with the valve in the first state of the stop device, and the cut flat is intended to be turned towards the valve in the second state of the stop device.

Thus, the pin occupies little space.

Advantageously, the said cut flat is present on a portion of the length of the said pin situated facing the valve.

In accordance with a particular embodiment, the actuator comprises a motor able to bias an actuating piston in translation and a crank able to transform the movement of translation of the actuating piston into a movement of rotation of the pin.

Preferably, the actuator has a first state corresponding to the first state of the stop device and a second state corresponding to the second state of the stop device, the first and second states of the said actuator being stable states.

Advantageously, the said actuator is electrical.

In accordance with a particular embodiment, the motor comprises a solenoid co-axial with an actuating piston, such that the actuating piston is at least partially arranged in the solenoid and is moveable in translation in the direction of the axis of the solenoid.

Preferably, the predetermined rest position of the said piston is a stop position of the piston defined relative to the master cylinder body.

The rest position of the piston is then precisely defined. In the case of a valve which opens by co-operation with a stop device, the opening position of the valve and therefore the degree of opening of the recovery conduit depend on the position of the piston. It is therefore possible to precisely dimension the degree of opening.

The invention also provides a braking system for a vehicle, characterised by the fact that it includes a master cylinder assembly in accordance with the above description, at least one sensor to determine the value of at least one state variable and an electronic controller able to control the actuator as a function of an instantaneous state of the vehicle defined by the state variable.

Several types of controls can be employed in such a system. A first possibility is to consider that the actuator must by default position the valve in the opening position. In this case, the actuator is only caused to adjust the valve into the closing position when particular conditions (logical closing state) coincide. Another possibility is to consider that the actuator must by default position the valve in the closing position. In this case the actuator is only caused to adjust the valve into the opening position when particular conditions (logical opening state) coincide. These two approaches can also be combined, in which case there is in fact no default position.

The invention also proposes a process for operating a braking system in accordance with the above description, in which the electronic controller performs the steps consisting of: determining the said instantaneous state of the vehicle from measurements of at least one sensor; testing the presence of at least one logical closing state, wherein each logical closing state is defined by the fact that the state variable fulfils one or more closure conditions; and when the instantaneous state of the vehicle corresponds to a logical closing state, controlling the said actuator to adjust the valve into the closing position.

Advantageously, the braking system includes a pressure sensor able to measure an hydraulic pressure at the output of the said master cylinder assembly, whereby a logical closing condition is a pressure condition, which condition is verified when the value emitted by the pressure sensor is lower than a predetermined threshold pressure. Thus, it is for example possible to allow closing of the recovery conduit only when such a condition is satisfied in the rest position of the piston.

In accordance with a particular embodiment, the braking system includes an ignition sensor able to determine the state of an ignition contact of the vehicle, whereby a logical closing condition being an ignition condition which condition is verified when the value emitted by the ignition sensor indicates that the ignition contact of the vehicle is ignited.

The invention also proposes a process for operating a braking system in accordance with the above description, in which the electronic controller performs the steps of: determining the instantaneous state of the vehicle from measurements of at least one sensor; testing the presence of at least one logical opening state, each logical opening state being defined by the fact that the state variable fulfils one or more opening conditions; and when the instantaneous state of the said vehicle corresponds to a logical opening state, controlling the actuator to adjust the said valve into the opening position.

Preferably, the braking system includes a pressure sensor able to measure a hydraulic pressure at the output of the master cylinder assembly, whereby a logical opening condition is a pressure condition, which condition is verified when the value emitted by the pressure sensor is greater than a predetermined threshold pressure. Thus, it is for example possible to allow opening of the recovery conduit only when such a condition is satisfied in the rest position of the piston.

Advantageously, the braking system includes an ignition sensor able to determine the state of an ignition contact of the vehicle, whereby a logical opening state is defined by a logical opening condition which is an ignition condition, which condition is verified when the value emitted by the ignition sensor indicates that the ignition contact of the vehicle is extinguished.

Thus, when the ignition contact of the vehicle is extinguished to leave the vehicle stationary, and if the hydraulic circuit at the output of the master cylinder assembly has a leak, the level of liquid in the supply reservoir drops due to the fact that the valve is maintained in the opening position. The leak will therefore be detected on the basis of the level of liquid in the reservoir.

In accordance with a particular embodiment, the braking system includes a braking sensor able to determine the position of a brake pedal of the vehicle and a pressure sensor able to measure a hydraulic pressure at the output of the master cylinder assembly, whereby a logical opening state is defined by the intersection between at least one logical opening condition which is a braking condition, which condition is verified when the value emitted by the braking sensor indicates that the brake pedal is in the released position, and a logical opening condition which is a pressure condition, which condition is verified when the value emitted by the said pressure sensor is greater than a predetermined threshold pressure.

BRIEF DESCRIPTION OF DRAWINGS

The invention will be better understood and other aims, details, characteristics and advantages of it will become more clearly apparent in the course of the following description of a particular embodiment of the invention, given solely in illustrative and in no way limiting manner, with reference to the attached drawings. In these drawings:

FIG. 1 is a partial view in axial longitudinal section of a master cylinder assembly in accordance with an embodiment of the invention, with a valve in a closing position;

FIG. 2 is a similar view of the master cylinder assembly of FIG. 1, with a valve in an opening position;

FIG. 3 is a cross-section of a pin present in the master cylinder assembly of FIG. 1;

DETAILED DESCRIPTION OF INVENTION

Figure 4:
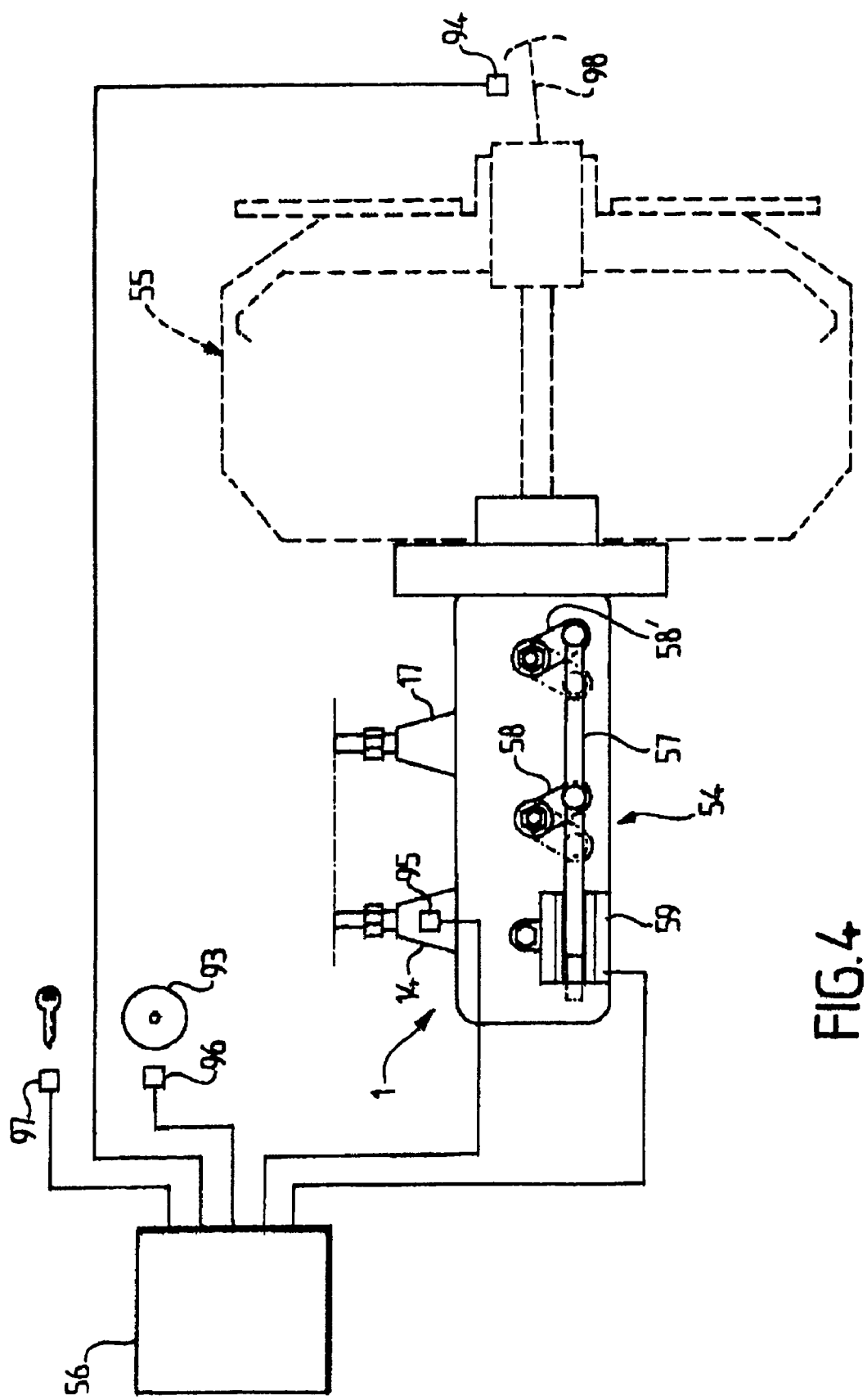
FIG. 4 is a view from below of the master cylinder assembly of FIG. 1.

FIG. 1 shows partially a master cylinder assembly 1 of tandem type, at the level of a secondary piston assembly 6, in a rest position. The master cylinder assembly 1 permits control of the braking of a motor vehicle. The master cylinder body 2 is metal and is generally symmetrical about a longitudinal axis A, and includes a cylindrical bore 3 along axis A emerging at a rear end of the master cylinder body 2. Conventionally, the axis A is defined as being a front-to-rear axis, the front being to the left of FIG. 1 and the rear to the right of FIG. 1. These terms "front" and "rear" do not refer to the environment of the master cylinder assembly 1 and may coincide, but do not necessarily coincide, with what are called "front" and "rear" in the environment of the master cylinder assembly 1 when this is fitted in a vehicle.

Into the bore 3 are successively introduced a secondary spring 4 which bears on a front end wall (not shown) of the bore 3, a secondary piston assembly 6 having a front end which bears on the secondary spring 4, a primary spring 7 and a primary piston assembly. The primary piston assembly being arranged in a similar manner to the secondary piston assembly 6, it is neither described in detail nor shown.

On its outside surface, the master cylinder body 2 presents a secondary pressure outlet nozzle 14 shown in FIG. 4, intended to be connected to a hydraulic device to be controlled, such as a brake caliper, and emerging in a secondary pressure chamber 16 formed in the bore 3 between the front end wall of the body 2 and the seal dish 15 of the secondary piston assembly 6. A primary pressure output nozzle 17 shown in FIG. 4, also intended to be connected to a hydraulic device to be controlled, emerges in a primary pressure chamber 18 formed in the bore 3 between the seal dish 19 of the secondary piston assembly 6 and the primary piston.

A secondary supply projection 26 is provided with a connecting nozzle (not shown) intended to be connected to the brake liquid reservoir 5 and is connected to the bore 3 by a secondary supply conduit 28 which emerges in the bore 3 permanently in a secondary supply chamber 29 situated between the seal dishes 15 and 19 of the secondary piston assembly 6. Due to the conduit 28, the hydraulic pressure in the chamber 29 corresponds to that in the reservoir 5, typically atmospheric pressure.

The secondary piston assembly 6 includes a longitudinal body 33 which carries the seal dishes 15 and 19, respectively, at the level of its front end and its rear end and which, between the seal dishes 15 and 19, presents a central portion 34 of smaller diameter which is crossed transversally by a longitudinal groove 35. The secondary supply chamber 29 includes the free space around the central portion 34 and the inside of the groove 35.

The longitudinal body 33 has passing through it a longitudinal recovery conduit 36 which emerges in the front face of the secondary piston assembly 6 and in the groove 35 and thus connects the secondary pressure chamber 16 to the secondary supply chamber 29 by-passing the seal dish 15. The conduit 36 can be coaxial with the bore 3, but this is not necessary. The assembly 6 is extended to the front by a cylindrical sleeve 37 in which is housed a spring 41 bearing on a washer 42 fixed to the sleeve 37 and on a moveable valve 38. The valve 38 comprises a valve head 39 and a seal packing 40 fixed to the head 39, and is extended longitudinally towards the rear by an opening rod 43 which passes through the conduit 36 up to the inside of the groove 35 and is longitudinally guided in the conduit 36. The spring 41 biases the moveable valve 38 to the rear towards a position of closing of the conduit 36.

A stop pin 50 is longitudinally retained in the bore 3 and passes through the chamber 29 and the groove 35. The pin 50 is circularly cylindrical and can be displaced in rotation. It presents, on a portion of its length situated at the level of the valve 38, a notch 52. FIG. 3 shows a cross-section of the pin 50, at the level of the notch 52. At this level, the perimeter of the pin 50 includes a circular section 53 which, with the base 51 of the notch 52, forms a cam surface.

FIG. 1 shows the master cylinder assembly 1 with the pin 50 in a position permitting the conduit 36 to be closed when the secondary piston assembly 6 is in its rest position. In its rest position, the secondary piston assembly 6 abuts against a ring 99 fixed in the master cylinder body 2 around the pin 50. In this configuration, the notch 52 is turned towards the rod 43 of the valve 38, and the rod 43 enters the notch 52 without entering into contact with the pin 50. Thus, the valve 38, biased by the spring 41 into the closed position, closes the conduit 36. If the secondary piston assembly 6 is biased forwardly, the hydraulic pressure will directly increase in the chamber 16. There is no dead travel.

An actuator 54, shown partially in FIG. 1 and which will be described in detail with reference to FIG. 4, allows the pin 50 to be turned into another position such that the notch 52 is not facing the rod 43. For greater clarity, the notch 52 has been shown in FIG. 2 on the side opposite to the rod 43, although in reality it is sufficient for it to be turned by a smaller angle, for example of approximately 90 degrees, relative to the position of FIG. 1.

FIG. 2 shows the master cylinder assembly 1 with the notch 52 turned to the side opposite to rod 43 and the secondary piston assembly 6 in its rest position. In this configuration, the rod 43 is in abutment against the outside surface of the pin 50, at the level of the circular surface 53. On rotation of the pin 50 corresponding to passage from the position of FIG. 1 to the position of FIG. 2, when the assembly 6 is in the rest position, the cam surfaces 51 and 53 transforms the rotary movement of the pin 50 into a movement of translation towards the front of the rod 43. Thus, in the configuration of FIG. 2, the valve 38 is in the open position, and the hydraulic pressure in chamber 16 is returned to that of chamber 29.

Moreover, if the hydraulic circuit connected to the nozzle 14 has a leak, the level of the liquid in the reservoir 5 drops, which allows the leak to be detected.

FIG. 4 shows a view from below of the master cylinder assembly 1. The assembly 1 comprises an actuator 54 fixed below and to the outside of the master cylinder body 2. The assembly 1 is fixed by a fixing flange 30 which projects laterally at the level of the rear of the master cylinder body 2 onto a front casing wall of an amplifying servomotor 55 which is itself known, shown in broken lines, which is itself controlled by means of a brake pedal 98.

The actuator includes a piston rod 57, the axis of which is parallel with axis A. The rod 57 is moveable in translation and can be displaced between two limit positions which are predefined, for example, by means of a stop or restraint not shown. A crank 58 is rigidly attached in rotation to the pin 50. The crank co-operates with the rod 57 to transform the movement of translation of the rod 57 into a movement of rotation of the pin 50. Thus, a movement of translation of the rod 57 from one limit position to the other allows the pin 50 to pass from the position of FIG. 1 to the position of FIG. 2, and vice versa. In similar manner, a crank 58' allows rotation of the pin situated at the level of the primary piston assembly.

The actuator 54 also includes a solenoid 59 coaxial with the rod 57, and into which the rod 57 partially enters. A controller 56 is able to pass an electric current in one direction or the other in the solenoid 59, which has the effect of displacing the rod 57 in translation in one direction or the other in order to pass it from one of limit position to the other.

In the absence of current in the solenoid, the stop or retaining means holds the rod 57 in position. In other words, the limit positions of the rod 57 are stable positions.

Alternatively, a spring could elastically bias the rod 57 into the position corresponding to FIG. 2, which would be the default position. In this case, the controller would have to pass current in the solenoid 59 to displace and hold the rod 57 in the position corresponding to FIG. 1, which would be an unstable position. This alternative embodiment offers increased safety, since the valve 38 can open even in case of failure of the actuator.

The assembly 1 is integrated in a vehicle braking system. The braking system includes the controller 56 which allows control of the actuator 54. The controller 56 receives the signals from a plurality of sensors.

An ignition sensor 97 allows determination of whether the ignition contact of the said vehicle is ignited, that is, closed. When the contact is opened, the supply to the controller 56 is maintained for a predetermined period during which the ignition sensor 97 indicates to the controller 56 that the contact is open. During this predetermined period, the controller 56 can take this information into account in controlling the actuator 54. The ignition sensor 97 provides a binary signal IGN taking the value ON when the contact is closed and the value OFF when the contact is open.

A braking sensor 94 permits determination of the position of the brake pedal 98 of the vehicle. The braking sensor provides a binary signal BS taking the value ON when the brake pedal is depressed and the value OFF when the brake pedal is completely released.

A pressure sensor 95 permits measurement of the hydraulic pressure at the output of the master cylinder assembly 1, at the level of the output nozzle 14 or 17. Normally, these pressures are equal and a single pressure sensor is sufficient. Preferably, by way of modification, there are two pressure sensors, one at each output nozzle, in order to have a reliable pressure measurement available even in case of leakage in one of the two hydraulic circuits. The pressure sensors provide analogue signals having an amplitude proportional to the pressure. The controller 56 transforms these signals into two digital values and selects the highest value P.

Wheel velocity sensors 96 permit determination of whether each of the wheels 93 of the vehicle is rotating. The wheel velocity sensor provides a binary signal WS taking the value ON if the wheel is rotating and the value OFF if the wheel is stopped.

The controller 56 executes a program for control of the assembly 1. This program determines the position which the pin 50 must adopt as a function of the signals provided by the sensors and controls the solenoid 59 to position the pin 50 in the determined position.

EXAMPLE

To illustrate a particular example, table 1 gives the position determined by the control program as a function of the signals provided by the sensors. In this table, P1 and P2 signify the positions shown respectively in FIG. 1 and FIG. 2, and P0 is a predetermined value stored by the controller 56, corresponding to a threshold pressure. P0 is selected slightly greater than atmospheric pressure, for example around 1.3 to 1.4 bar.

TABLE 1

|     | P1      | P2  | P1      | P2      |
|-----|---------|-----|---------|---------|
| IGN | ON      | OFF | ON      | ON      |
| BS  | OFF     |     | OFF     | OFF     |
| P   | P < P0  |     | P < P0  | P > P0  |
| WS  | OFF     | OFF | ON      | ON      |

The first two columns relate to the vehicle when stationary (WS=OFF,) while the last two columns relate to the vehicle in motion (WS=ON). The empty cells signify that the value of the signal is irrelevant.

Figure 5:
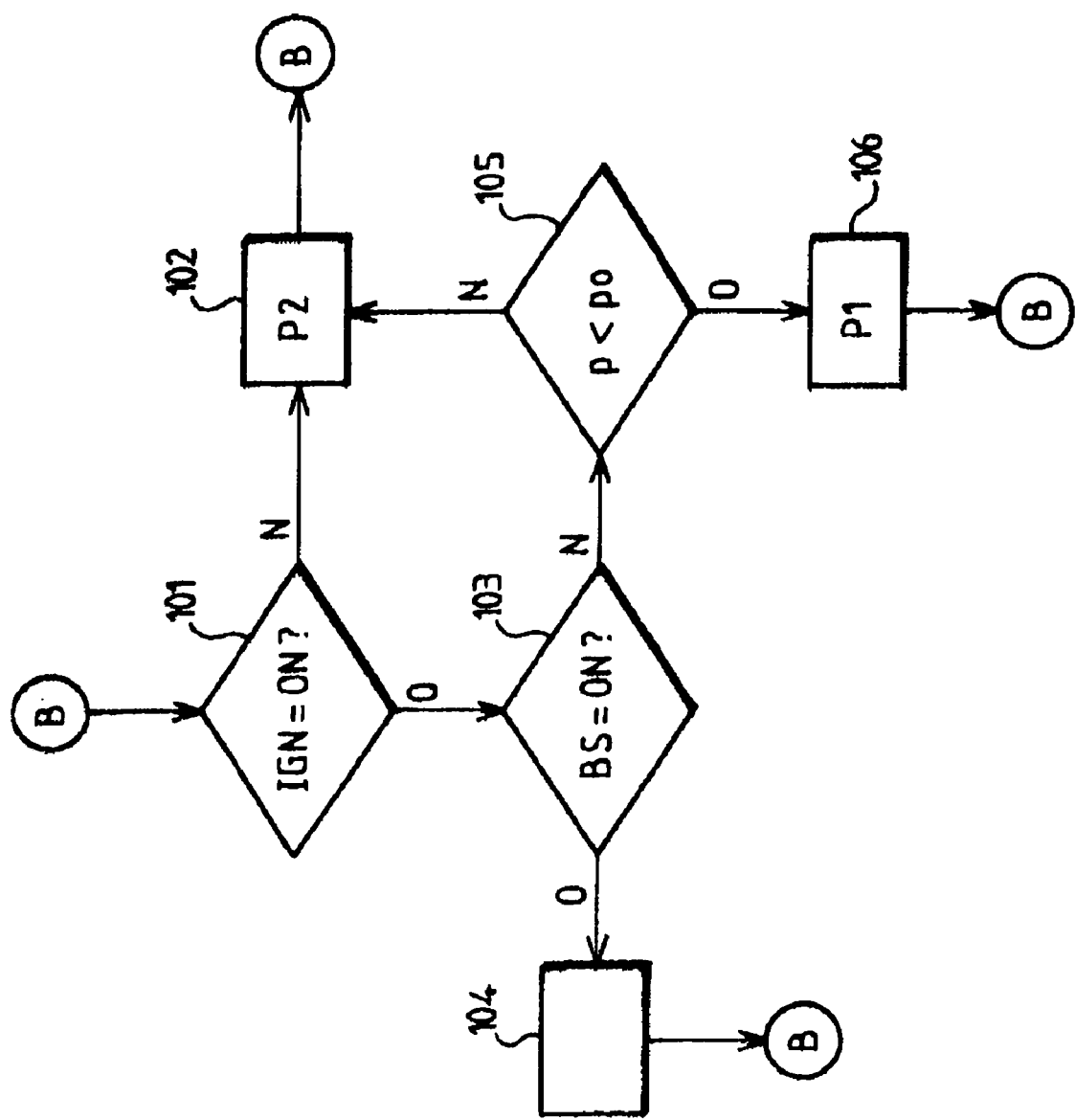
FIG. 5 shows the steps of a program for controlling the master cylinder assembly of FIG. 1.

FIG. 5 shows the steps of the control program corresponding to this example. Execution of the program starts at the entry point B and then passes to step 101.

In step 101, the program tests whether the signal provided by the ignition sensor 97 indicates that the contact is closed. If this is not the case, the program passes to step 102. If this is the case, the program passes to step 103.

In step 102, the controller 56 controls the actuator 54 to position the pin 50 in the position P2, and then the program returns to point B.

In step 103, the program tests whether the signal provided by the braking sensor 94 indicates that the brake pedal is depressed. If this is the case, the program passes to step 104, otherwise it passes to step 105.

In step 104, the controller 56 leaves the actuator 54 in its current state, and then the program returns to point B.

In accordance with another modification, in step 104 the controller 56 controls the actuator 54 to position the pin 50 in the position P1, and then the program returns to point B. Thus, when the brake pedal is released and then directly again depressed, the pin 50 is in the position corresponding to the absence of dead travel.

In step 105, the program compares the value P with the value P0 to determine whether the pressure is lower than the threshold pressure. If this is the case, the program passes step 106, otherwise it passes to step 102.

In step 106, the controller 56 controls the actuator 54 to position the pin 50 in the position P1, and then the program returns to point B.

The tests performed on execution of this program permit determination of an instantaneous state of the vehicle, to then determine a target state of the pin 50 and generate a signal for control of the solenoid 59 in order to position the pin 50 in the target state. For example, in step 106, the instantaneous state of the vehicle defined by the conditions (IGN=NO) and (BS=ON) and (P<P0) corresponds to the target state P1.

A tandem master cylinder assembly has been described in which the two piston assemblies each include a valve, and an actuator able to adjust the position of the two valves. Alternatively, the invention can be applied to production of a tandem master cylinder only including a single adjustable pin or to a master cylinder assembly only including a single piston.

A rotatable pin has been described presenting a cam surface defined by the base of a notch. Alternatively, the cam surface could be defined by an eccentric. The pin could be moveable in translation and present a conical portion able to co-operate with the valve on a movement of translation and defining the cam surface.

With reference to FIG. 1, it has been described that the rod of the valve is not in contact with the pin. Alternatively, the rod could be in adjusted contact with the pin, without the pin applying a force tending to displace the valve into its opening position.

In a simplified embodiment, the control program could use only certain of the state variables described above. For example, the process shown in FIG. 5 could be simplified by eliminating steps 101 and 103. In accordance with another example, the program could only use the signal provided by the ignition sensor, to position the pin in the position of FIG. 1 when the signal provided by the ignition sensor indicates that the contact is ignited and in the position of FIG. 2 when the signal provided by the ignition sensor indicates that the contact is extinguished. Alternatively, the control program could use additional variables to those described, such as the wheel velocity signal.

The electronic controller 56 can be in a centralised form or a distributed form; using specific equipment components or standard equipment components specifically programmed, or a combination of such means.

Although the invention has been described with reference to a particular embodiment, it is quite obvious that it is in no way limited to it and that it includes all the technical equivalents of the means described and their combinations if these fall within the framework of the invention.

The invention claimed is:

1. A master cylinder assembly for hydraulic control comprising:
   a master cylinder body having a longitudinal bore;
   a piston arranged in said bore, said piston comprising a seal packing in tight contact with a peripheral wall of said bore and separating said bore into two chambers adapted to contain a liquid, said piston further comprising a recovery conduit and a valve, said recovery conduit connecting said two chambers, said valve being movable between a open position, thereby opening said recovery conduit to allow fluid flow therethrough, and a closed position, thereby closing said recovery conduit to fluid flow, said valve being biased to said closed position, said piston having a rest position within said bore;
   a pin arranged in said bore and adapted to co-operate with said valve when said piston is in said rest position, said pin having a cam surface moveable between a first state corresponding to said open position and a second state corresponding to said closed position;
   a crank connected to said pin;
   a rod rotateably connected to said crank; and
   an electrical actuator arranged outside of said master cylinder body, said actuator being operably coupled to said rod to adjust a position of said pin between said first state and said second state when said piston is in said rest position.

2. A master cylinder assembly as described in claim 1, wherein said pin has a peripheral surface comprising a circular portion that engages said valve in said first state and a cut flat that engages said valve in said second state.

3. A master cylinder assembly as described in claim 2, wherein the cut flat is disposed over a portion of the length of the pin adjacent the valve.

4. A master cylinder assembly as described in claim 1 wherein the rest position of the said piston is a stop position relative to the master cylinder body.

5. A process for operating a braking system of a vehicle, said braking system comprising:
   a master cylinder assembly comprising a master cylinder body having a longitudinal bore;
   a piston separating said bore into two chambers adapted to contain a liquid, said piston further comprising a recovery conduit connecting said chambers and a valve carried by said piston and movable between a open position opening said recovery conduit to allow fluid flow therethrough and a closed position closing said recovery conduit to fluid flow, said piston having a rest position within said bore; and
   an actuator adapted to adjust a position of said valve when said piston is in said rest position between said open position and said closed position;
   said process comprising:
   determining a value for at least one state variable of said vehicle based upon a measurement of at least one sensor, wherein said state variable is ignition contact and said sensor is an ignition sensor;
   determining a presence of a logical opening condition or a logical closing condition based upon a value of said state variable, wherein said logical opening condition or said logical closing condition is indicated by ignition contact or noncontact within said vehicle, and
   controlling the actuator to adjust said valve into said open position or said closed position.

6. A process for operating a braking system of a vehicle, said braking system comprising:
   a master cylinder assembly comprising a master cylinder body having a longitudinal bore;
   a piston separating said bore into two chambers adapted to contain a liquid, said piston further comprising a recovery conduit connecting said chambers and a valve carried by said piston and movable between a open position opening said recovery conduit to allow fluid flow therethrough and a closed position closing said recovery conduit to fluid flow, said piston having a rest position within said bore; and
   an actuator adapted to adjust a position of said valve when said piston is in said rest position between said open position and said closed position;
   said process comprising:
   determining a position of a brake pedal of said vehicle and a hydraulic pressure at an output of said master cylinder assembly;
   determining a presence of a logical opening condition, wherein said logical opening condition is present when said position of said brake pedal is indicative of said brake pedal being in a released position and said hydraulic pressure is greater than a predetermined threshold pressure; and
   controlling said actuator to adjust said valve into said open position when said logical opening condition is present.

* * * * *